INVENTORS
CHARLES F. ROSELIUS
GEORGE A. PELIKAN
ALBERT C. MAGGIO

ATTORNEYS

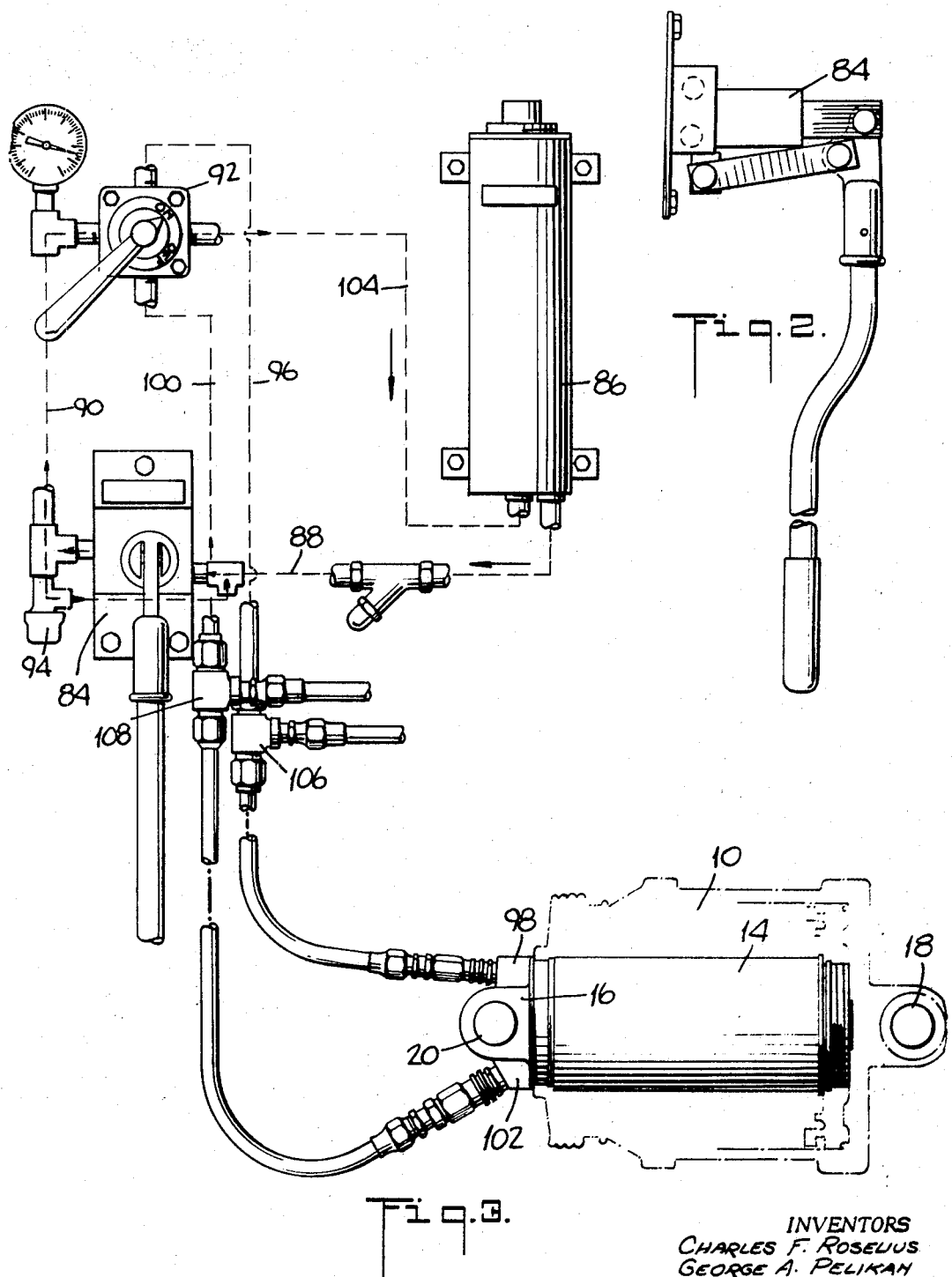

United States Patent Office 3,472,124
Patented Oct. 14, 1969

3,472,124
BRAKING APPARATUS
Charles F. Roselius, Kinnelon, and George A. Pelikan, Closter, N.J., and Albert C. Maggio, Brooklyn, N.Y., assignors to Ellcon-National, Inc., Totowa Borough, N.J., a corporation of New York
Filed Sept. 8, 1967, Ser. No. 666,419
Int. Cl. F15b 15/26
U.S. Cl. 91—45                                    7 Claims

ABSTRACT OF THE DISCLOSURE

A braking apparatus including an outer cylinder and cylinder head, an inner cylinder and cylinder head, and a piston disposed within the inner cylinder, said inner cylinder serving as the piston for the outer cylinder, means are provided for directing fluid into the cylinders for moving the outer cylinder alone with respect to the inner cylinder and piston, or moving the inner cylinder alone with respect to the outer cylinder and inner piston, and means are provided for mechanically locking the piston with respect to the inner cylinder.

---

Figure 1:
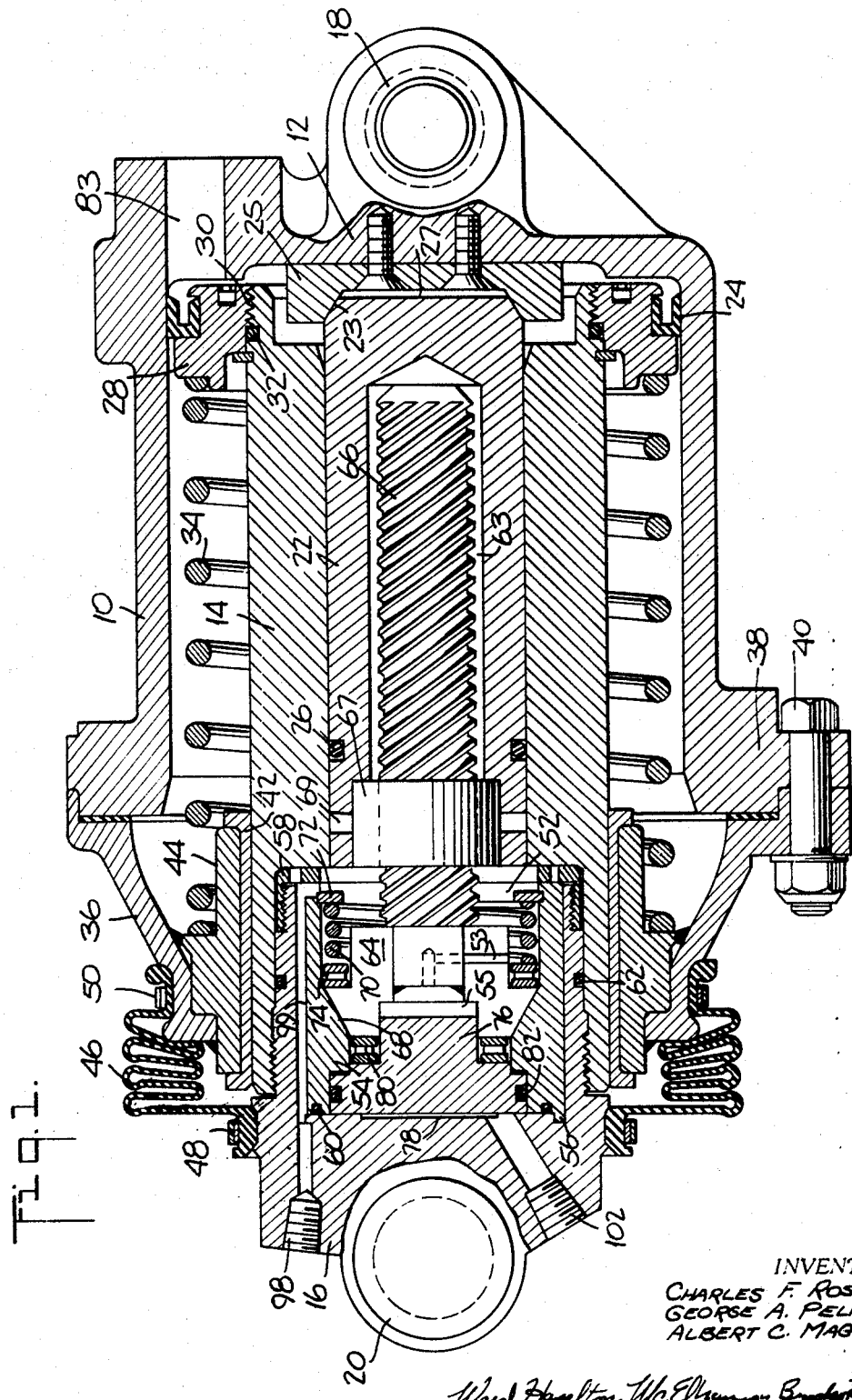

This invention relates to braking systems for railway vehicles, and more particularly to a multifluid braking apparatus incorporating a mechanical lock.

Brakes for railway vehicles are usually operated by two different means. An automatic air actuated brake system is employed for normal train operation, and a second manually-operated emergency or parking brake system is employed which is operated through mechanical linkage, and is commonly referred to in the art as the hand brake system.

Heretofore the brake shoes were applied against the wheels of a railway car by means of a single air brake cylinder on each vehicle, operating through a linkage system. The hand brake was connected into the brake rigging at the air brake cylinder so that the hand brake would apply the force through the same linkage to the brake shoes. With the advent of new high speed cars and locomotives, multicylinder application became common. Each truck of a railway car or locomotive has one or more brake cylinders and in some installations each wheel has one brake cylinder directly applying braking force to the brake shoe at the wheel. It will be appreciated that with these arrangements it is difficult to provide the usual mechanical hand brake linkage because the number of sheave wheels, levers, rods, etc., required to connect the mechanical hand brake with such various brake shoe locations is impractical, if not impossible. In order to overcome this problem it has been proposed to provide a hydraulic hand brake system because it is relatively simple to develop fluid pressure at the various points on the railway car or its trucks. Such a hydraulic system may be independent of the air brake system or it may be combined with the air brake systtem, as is shown in U.S. Patent No. 2,904,961 entitled "Multi-Fluid Brake Operating Motor."

Heretofore, in a multifluid brake system, the pressure developed was sustained by the tightness of the entire system. However, difficulty was experienced with this system due to the leakage developed in the cylinders, pistons, valves, lines and other points in the system, particularly after relatively long periods of sustained application. This loss of pressure, of course, rendered the brake ineffective. Accordingly, it is an object of this invention to overcome this prior art problem.

In essence the brake mechanism of our invention includes in combination, an outer cylinder which has an outer cylinder head, and an inner cylinder which has an inner cylinder head. The inner cylinder is mounted within the outer cylinder and functions as a piston with respect thereto. Both of the cylinder heads have power connections or ears, which are oppositely disposed one with respect to the other, for interconnection with the brake rigging by means of pins. A piston is mounted within the inner cylinder and means are provided for selectively controlling the fluid flow into and out of both cylinders at their cylinder heads, respectively, to move the outer cylinder alone with respect to the inner cylinder and piston, or to move the inner cylinder alone with respect to the outer cylinder and inner piston. Further, mechanical locking means are carried by the piston, and these means project into a cavity in the piston. Clutch means are mounted on the locking means for selectively connecting the locking means to the inner cylinder in operative relationship for purposes of selectively allowing or preventing relative motion between the piston and the inner cylinder.

In one form of our invention, the piston is provided with a peripheral chamfered edge surface at one end to engage a mating chamfered edge surface disposed in the outer cylinder head in order to limit the axial and rotational movement of the piston with respect to the outer cylinder head. As another feature of our invention, a bellows is interposed between the outer cylinder and the inner cylinder head to seal the space therebetween.

Further, according to one aspect of our invention, a nut is fixedly mounted on the inner cylinder, within the cavity of the piston, and a threaded screw passes therethrough. A conical clutch member is mounted on the end of the screw for engagement with a mating seat on the inner cylinder head. Spring means are mounted within the inner cylinder head for urging the clutch member to engage the seat, and a release piston is also mounted in the inner cylinder head for disengaging the clutch member. Fluid means are provided for moving the inner cylinder with respect to the position and the outer cylinder, and the same fluid means serve to disengage the clutch member. In one form of the invention these means comprise a reservoir, a pump, a selector valve, and means interconnecting these elements so that actuation of the selector valve in one direction causes high pressure fluid to separate the inner cylinder and the piston for applying a braking force, and subsequent loss of the high pressure due to leakage in the system causes the spring to urge the clutch member into engagement with its seat to mechanically lock the screw and piston with respect to the inner cylinder to retain the braking force indefinitely. Actuation of the selector valve in the opposite direction causes high pressure fluid to release the clutch member and allows the inner cylinder and piston to return towards each other for releasing the braking force.

A preferred embodiment of the invention has been chosen for purposes of illustration and description and is shown in the accompanying drawings, forming a part of a specification, wherein:

FIG. 1 is a transverse sectional view of a braking apparatus constructed in accordance with the concept of our invention, FIG. 2 is a side elevation of a pump utilized in conjunction with the braking apparatus of this invention; and FIG. 3 is a diagrammatic view of the fluid system employed for actuating the internal cylinder and piston elements of our braking apparatus.

In the illustrated embodiment of the invention, and with particular reference to FIG. 1, the brake mechanism includes an outer cylinder 10 which is provided with an outer cylinder head 12 at one end thereof. An inner cylinder 14 having an inner cylinder head 16 is mounted within the outer cylinder 10 and functions as a piston with respect thereto. Both the outer cylinder head 12 and the inner cylinder head 16 are provided with power connections or ears 18 and 20, respectively, for connection to the brake rigging by pinning the ears between two parts of the brake mechanism (not shown).

A piston 22, mounted within the inner cylinder 14, is free-floating in that it has no external connections. This piston is provided with a peripheral chamfered edge surface 23 at one end thereof and the outer cylinder head is provided with a fixedly attached friction block 25 having a mating chamfered surface, thereby limiting the axial and rotational movement of the piston 22 with respect to the outer cylinder head, and also providing space 27 therebetween. Sealing means 24 disposed between the outer cylinder 10 and the inner cylinder 14, and a packing ring 26 forms a seal between the inner cylinder 14 and piston 22. The head-like member 28 of the inner cylinder 14 is secured thereto as by means of a threaded connection 30 and a packing ring 32 provides a seal.

A spring 34 is provided for purposes of urging the inner cylinder 14 into the cylinder 10, or to the right as viewed in FIG. 1, the spring being interposed between the head-like member 28 of the inner cylinder 14 and a guide cap 36 mounted on flange 38 of the cylinder 10, as by means of bolt 40 provided for the purpose. An annular wear lining sleeve 42 is mounted on an annular cylindrical interior guide projection 44 of the cylinder cap 36 for guiding the inner cylinder 14. A bellows 46 is provided to seal the space between the guide cap 36 and the outer end of the inner cylinder 14, clamps 48 and 50 holding it in place.

The cylinder 14 contains an internal cavity or bore 52 for receiving the inner cylinder head 16. A sleeve 54 is disposed within the cavity or chamber 56 in the head 16 and is retained by collar 58. It will be appreciated that in another form of the invention the sleeve 54 may be integral with the head 16 and then collar 58 would not be necessary. Packing rings 60 and 62 serves to seal these parts from the pressure in cavity 52. The piston 22 is provided with an internal cavity 63 for receiving a multistart screw 66. This screw passes through a nut 67 which is fixedly attached to the piston 22 by means of locking screw 69 provided for the purpose.

Further, according to our invention, a cone clutch member 64, which is an integral part of screw 66, engages seat 68 of sleeve 54 due to the force exerted by spring 70 which bears against retainer 72 and thrust bearing 74. The clutch 64 is disengaged from seat 68 by the actuation of the release piston 76 when fluid pressure is developed in the cavity 78. A thrust bearing 80 facilitates the rotation of the combination screw 66 and clutch 64. A packing ring 82 serves to seal piston 76.

In operation, fluid, normally air under pressure, is admitted to the head end of the outer cylinder 10 through passage or port 83, thereby forcing the inner cylinder 14 outwardly, or to the left as viewed in FIG. 1. This air pressure also forces the piston 22 outward along with the inner cylinder 14, air having access to the end of the piston through space 27 provided for the purpose. Since the other end of the piston 22 engages the inner cylinder 14 through the clutch 64, it assists in moving the inner cylinder 14. When the fluid is exhausted through the port or connection 83, the spring 34 forces the inner cylinder 14 to return, carrying the piston 22 with it. That is, the inner cylinder 14 and the piston 22 act like a single piston. The engagement of the chamfered surface 23 with the friction block 25 and the engagement of the sleeve 54 with the clutch 64 keeps the end of the inner sleeve 14 based at a distance from the cylinder head.

For parking or emergency operation fluid pressure, usually liquid, is developed by a suitable pump such as a hand-operated reciprocating lever type pump 84, FIGS. 2 and 3, which receives fluid from a reservoir 86, through pipeline 88 and passes the fluid under pressure through pipeline 90 to a manually-operated selector valve 92, pipeline 90 being provided with a relief valve 94 for safety purposes. The selector valve 92 is manually-operated to indicate release or apply. That is, by means of manipulating selector valve 92, the high pressure fluid from the pump may be directed through pipeline 96 to the apply connection 98 of the inner cylinder head 16, or the return fluid may be directed through pipeline 96 from the connection 98 through pipeline 104 back to the reservoir 86. When the selector valve 92 is in its last named position, high pressure fluid from the pump is directed through a pipeline 100 to the release connection 102 of the inner cylinder head 16. It will be appreciated that a plurality of cylinder assemblies could be supplied from one pump and reservoir by means of connections 106 and 108 in the apply and release lines, respectively.

As best seen in FIG. 2 when selector valve 92 is turned to its apply position, liquid under pressure passes from the reservoir through the pump and enters the apply connection 98. As best seen in FIG. 1, the liquid passes from connection 98 through passage 99 to cavity 52 and from there through passage 53 to cavity 55 where liquid under pressure acts on the piston 22, thereby separating the piston 22 and the inner cylinder 14 which moves the ear or power connection 20 outwardly, and through linkage, not shown, applies the brake shoes against the wheels or brake discs. As the piston 22 and retaining collar 58 separate, screw 66 is caused to rotate by nut 67 while clutch 64 turns freely in its bearings. It will be appreciated that simultaneously pressure is developed in cavity 55 which urges the release piston 76 towards the cylinder head 16. It will be noted that when the selector valve 92, FIG. 3, is in this position, cavity 78 of piston 76, FIG. 1, is at atmospheric pressure as the liquid can flow to the reservoir through connection 102, pipeline 100, valve 92, and pipeline 104, as seen in FIG. 3.

As long as pressure is maintained in cavity 52, the brakes are applied by fluid power. When the pressure drops, due to leakage or for any other reason, the clutch 64 moves into contact with seat 68 due to the action of spring 70. This prevents rotation of the screw 66 in the nut 67, thereby holding the power connections 18 and 20 apart and keeping the brakes in their applied position by this mechanical locking action. It is noted that when the brakes are applied hydraulically and are held by the mechanical lock, the chamfered edge surface 23 of piston 22 engages friction block 25 on its mating surface to wedge piston 22, thereby preventing it from rotating under the torque developed by screw 66 in nut 67.

In order to release the brake, the operator turns the selector valve 92, FIG. 3, to its release position. This causes any pressure in cavity 52, FIG. 1, to drop to atmospheric pressure as it is connected to the reservoir 86, FIG. 3, through connection 98, pipeline 96, valve 92, and pipeline 104. When the selector valve 92, FIG. 3, is in this position, it connects the high-pressure liquid in pipeline 90 to pipeline 100 and into the release connection 102 of the inner cylinder head 16, thereby subjecting cavity 78, FIG. 1, to high pressure for urging release piston 76 to the right, as viewed in FIG. 1, to lift the clutch 64 off the seat 68. The brake force in the brake linkage, not shown, causes the piston 22 and inner cylinder 14 to come together as screw 66 is free to rotate. This return movement is assisted by the air cylinder return spring 34. It will be appreciated that a return spring can be incorporated inside the inner cylinder 14 for the same purpose when this unit is used without the air cylinder portion. This permits the piston to return and the brakes to release.

What is claimed and desired to be secured by Letters Patent is:

1. Braking apparatus of a class described, the combination comprising an outer cylinder having an outer cylinder head, an inner cylinder having an inner cylinder head mounted within said outer cylinder, said cylinder heads being oppositely disposed and each having a power connection thereon, a piston mounted within said inner cylinder, means for selectively controlling fluid flow into and out of said cylinders at said cylinder heads respectively to move the outer cylinder alone with respect to said inner cylinder and piston, or to move the inner cylinder alone with respect to said outer cylinder and piston, said piston having an internal cavity, mechanical locking means carried by said piston and projecting into said cavity, clutch means mounted on said locking means for selectively connecting said mechanical locking means to said inner cylinder in operative relationship, thereby to selectively allow or prevent relative motion between said piston and said inner cylinder.

2. Braking apparatus according to claim 1 wherein said piston is provided with a peripheral chamfered edge surface at one end and said outer cylinder head is provided with a mating chamfered surface, thereby limiting the axial and rotational movement of said piston with respect to the outer cylinder head and providing space therebetween.

3. Braking apparatus according to claim 1 further comprising a bellows interconnected between said outer cylinder and said inner cylinder head.

4. Braking apparatus according to claim 1 wherein said mechanical locking means includes a nut fixedly mounted within said piston, a screw which passes through said nut, said clutch means being mounted on said screw adjacent said inner cylinder head.

5. Braking apparatus according to claim 4 wherein said means for selectively controlling the fluid flow into and out of the inner cylinder head comprises a reservoir, a pump, a selector valve, means interconnecting said pump, reservoir, selector valve and inner cylinder head in fluid flow communication so that actuation of said selector valve in one direction causes high pressure fluid to separate said inner cylinder and said piston for applying a braking force, and actuation of said selector valve in the opposite direction releases the high pressure seperating the inner cylinder and piston, and causes high pressure to disengage said clutch, thereby releasing the braking force.

6. Fluid actuated braking apparatus of the class described, a combination comprising a cylinder, a cylinder head, a piston mounted within said cylinder, said piston having an internal cavity, a nut fixedly attached to said piston and disposed within said cavity, an elongated threaded screw carried by said nut and extending into said cavity, a clutch member fixedly attached to said screw and disposed adjacent said cylinder head, said cylinder head having a mating seat for said clutch member, a first thrust bearing mounted on said clutch member, a spring interposed between said thrust bearing and said cylinder head to urge said clutch member into engagement with said seat, a release piston mounted within said cylinder head adjacent said clutch member, a second thrust bearing interposed between said release piston and said clutch member, said cylinder head having an apply connection in fluid flow communication with a cavity adjacent the end of said piston, said cylinder head having a release connection fluid flow communication with a cavity adjacent said release piston, a reservoir, a pump, a selector valve, means for interconnecting said reservoir, pump, selector valve, apply connection and release connection in fluid flow communication so that actuation of said selector valve in one direction causes high pressure fluid to enter said cavity adjacent the end of said piston to separate said cylinder and said piston for applying a braking force, and subsequent loss of said high pressure causes said spring to engage said clutch member with said seat to mechanically lock said screw and piston with respect to said cylinder to retain the braking force, and actuation of said selector valve in the opposite direction causes high pressure fluid to flow into said cavity adjacent said release piston, thereby disengaging said clutch member and allowing said cylinder and piston to return towards each other.

7. Fluid actuated braking apparatus of the class described, the combination comprising an outer cylinder having an outer cylinder head, an inner cylinder having an inner cylinder head mounted within said outer cylinder, said cylinder heads being oppositely disposed and each having a power connection thereon, a bellows interconnected between said outer cylinder and said inner cylinder head, a piston mounted within said inner cylinder, said piston having an internal cavity, a nut fixedly attached to said piston and disposed within said cavity, an elongated threaded screw carried by said nut and extending into said cavity, a clutch member fixedly attached to said screw and disposed adjacent said inner cylinder head, said inner cylinder head having a mating seat for said clutch member, a first thrust bearing mounted on said clutch member, a spring interposed between said bearing and said inner cylinder head to urge said clutch member into engagement with said seat, a release piston mounted within said inner cylinder head adjacent said clutch member, a second thrust bearing interposed between said release piston and said clutch member, said inner cylinder head having an apply connection in fluid flow communication with a cavity adjacent the end of said piston, said inner cylinder having a release connection in fluid flow communication with a cavity adjacent said release piston, said outer cylinder head having a connection for fluid flow into and out of said outer cylinder to move said outer cylinder alone with respect to said inner cylinder and piston, said piston being provided with a chamfered edge surface at the end thereof adjacent said outer cylinder head and said outer cylinder head being provided with a mating chamfered surface for limiting the axial and rotational movement of said piston, a liquid reservoir, a pump, a selector valve, means for interconnecting said reservoir, pump, selector valve, apply connection and release connection in fluid flow communication so that actuation of said selector valve in one direction causes high pressure fluid to enter said cavity adjacent the end of said piston to separate said cylinder and said piston for applying a braking force, and subsequent loss of said high pressure causes said spring to engage said clutch member with said seat to mechanically lock said screw and piston with respect to said inner cylinder to retain the braking force, and actuation of said selector valve in the opposite direction causes high pressure fluid to flow into said cavity adjacent said release piston, thereby disengaging said clutch member and allowing said cylinder and piston to return towards each other for releasing the braking force.

References Cited

UNITED STATES PATENTS

| | | | |
|---|---|---|---|
| 2,632,426 | 3/1953 | Geesink | 92—17 |
| 2,643,642 | 6/1953 | Geyer | 92—17 |
| 2,689,585 | 9/1954 | Presnell | 91—426 X |
| 2,705,939 | 4/1955 | Geyer | 92—17 |
| 2,774,336 | 12/1956 | Geyer | 91—45 X |
| 2,801,615 | 8/1957 | Geyer | 92—17 X |
| 2,804,053 | 8/1957 | Geyer | 92—17 |
| 2,859,734 | 11/1958 | Elmer et al. | 91—45 |
| 2,886,008 | 5/1959 | Geyer et al. | 91—45 |
| 2,887,991 | 5/1959 | Driskel et al. | 92—24 |
| 2,904,961 | 9/1959 | Herbert | 91—167 |

MARTIN P. SCHWADRON, Primary Examiner

IRWIN C. COHEN, Assistant Examiner

U.S. Cl. X.R.

92—17, 24